March 28, 1939.  H. W. WILLIAMS  2,151,820
ELEVATOR CONTROL SYSTEM
Filed Jan. 9, 1937  16 Sheets-Sheet 1
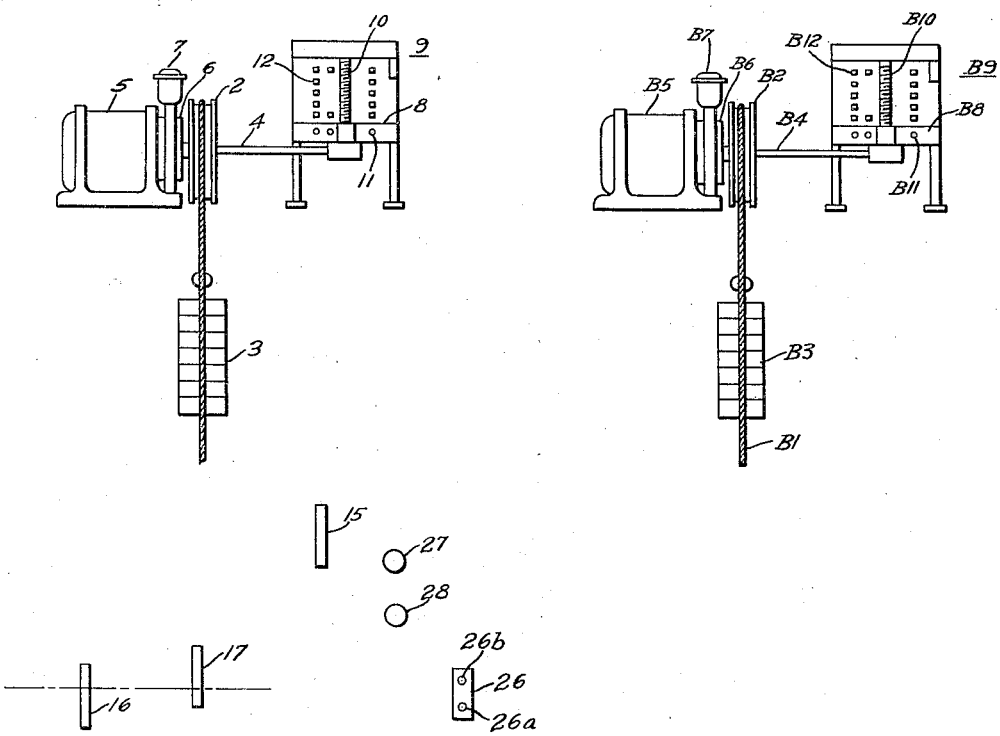
Fig.1.
Fig.2.
WITNESSES:
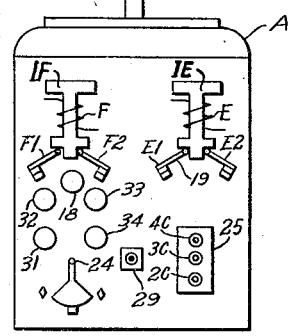
INVENTOR
Harold W. Williams.
BY
ATTORNEY

Fig. 5 A.

March 28, 1939.  H. W. WILLIAMS  2,151,820

ELEVATOR CONTROL SYSTEM

Filed Jan. 9, 1937  16 Sheets—Sheet 10

WITNESSES:
C.J. Weller.
W.T. Eames.

INVENTOR
Harold W. Williams.
BY
ATTORNEY

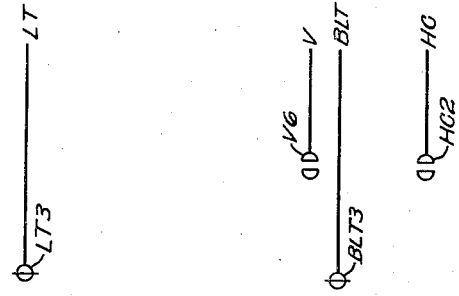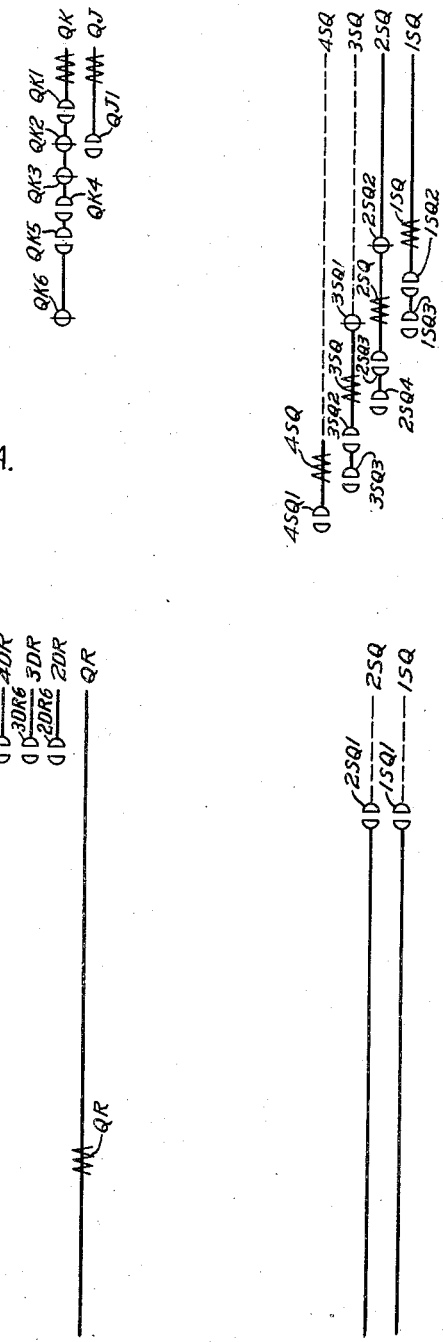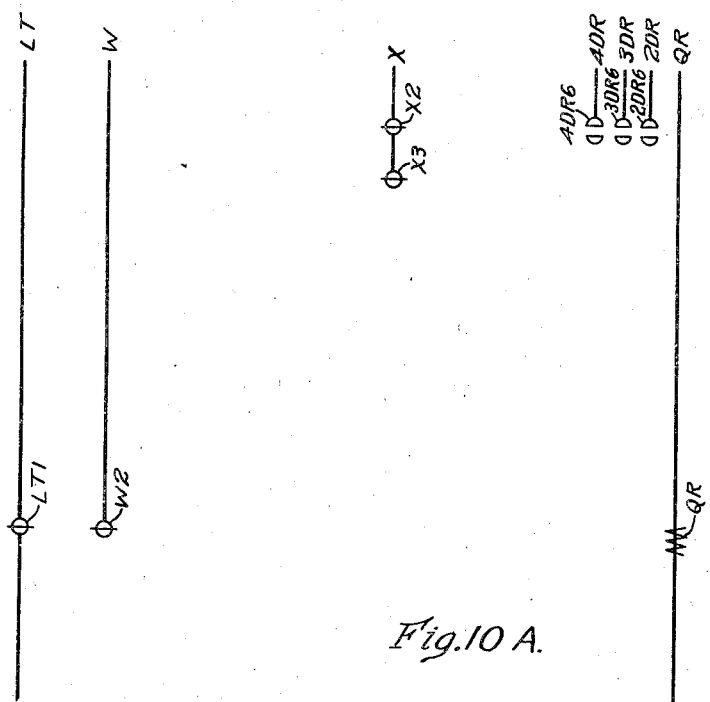

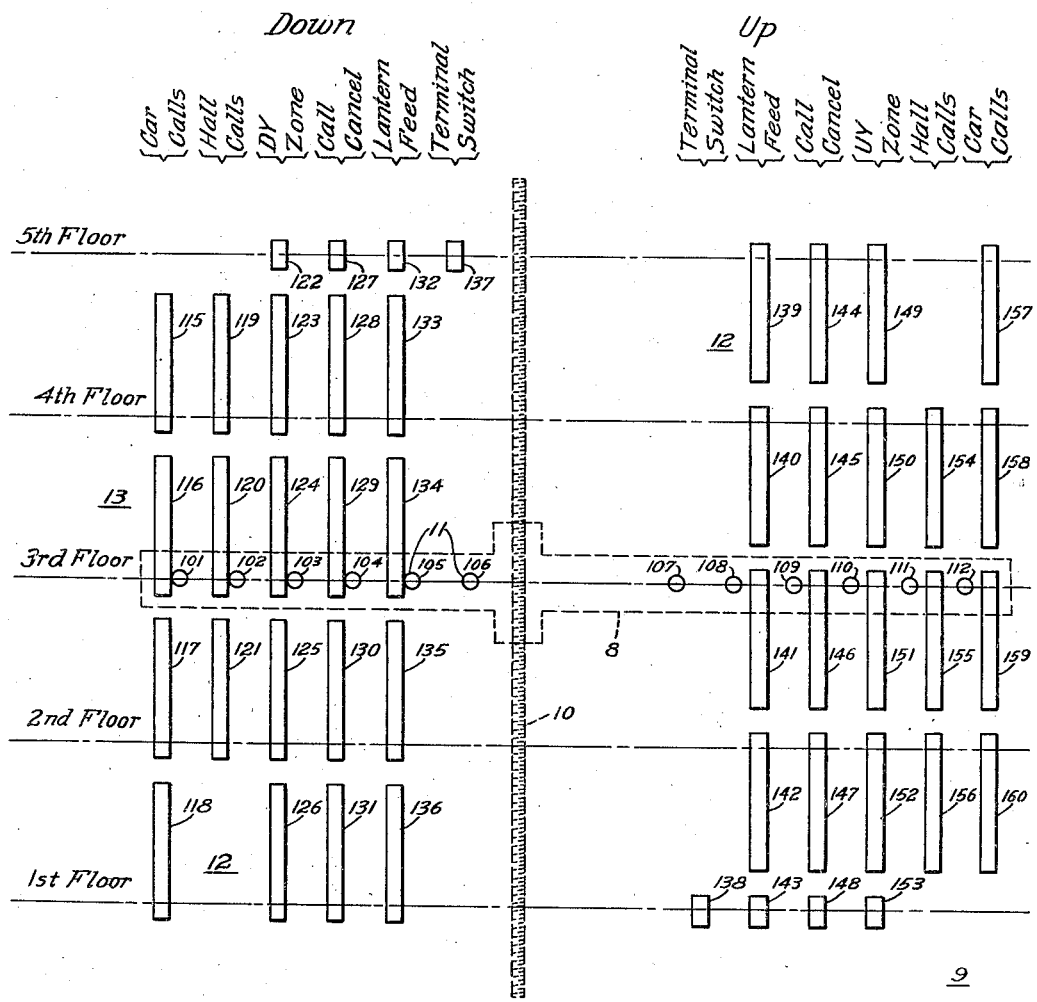

Patented Mar. 28, 1939

2,151,820

UNITED STATES PATENT OFFICE 2,151,820

ELEVATOR CONTROL SYSTEM

Harold W. Williams, Chicago, Ill., assignor to Westinghouse Electric Elevator Company, Chicago, Ill., a corporation of Illinois Application January 9, 1937, Serial No. 119,795

13 Claims. (Cl. 187—29)

My invention relates, generally, to electrical control systems, and it has particular relation to such systems as applied to a bank of elevator cars.

The application Serial No. 240,720, filed November 16, 1938, is a division of this application.

The object of my invention, generally stated, is to provide a combined elevator control and signalling system which shall be simple and efficient in operation and which may be readily and economically manufactured and installed.

One object of my invention is to provide a system for operating a bank of elevators so that all floors of the building being served will receive the same service.

Another object is to give a prospective passenger an indication immediately after the operation of the floor button at his floor as to which car of the bank will respond.

Another object is to so apportion the floor calls among the elevators so that each car will receive its share and thus maintain a uniform operating schedule among the cars.

A further object is to provide a mechanism for each car responsive to the calls registered that will limit the total stops for that car trip to a predetermined number.

A further object is to provide a dispatching mechanism that will start the cars in rotation from the terminals at equal intervals of time.

A still further object is to provide means for starting any car at a shorter than normal interval if it has accepted its quota of calls.

Another object is to restart the normal timing intervals when a car leaves after a short interval at the time the car leaves so that the next car in the sequence will follow at a normal interval.

Another object is to assign the floors to the various cars such that each car will accept floor calls only from floors between the car's position and the position of the next car ahead in the sequence.

Another object is to assign the down floors between the top terminal and the highest down car to the nearest up moving car in the event that there is no car at the top terminal.

Other objects of my invention will appear hereinafter.

My invention, accordingly, is disclosed in the embodiment hereof shown in the accompanying drawings, and comprises the features of construction, combination of elements and arrangement of parts, which will be exemplified in the construction hereinafter set forth and the scope of the application of which will be indicated in the appended claims.

For a more complete understanding of the nature and scope of my invention, reference may be had to the following detailed description, taken in connection with the accompanying drawings, in which:

Figure 1 shows one car and a portion of another of a bank of elevators that may be used in my invention.

Fig. 2 shows a motor driven timing device that may be used to dispatch the cars from certain dispatching floors in a sequence and at regular intervals.

Figure 3:
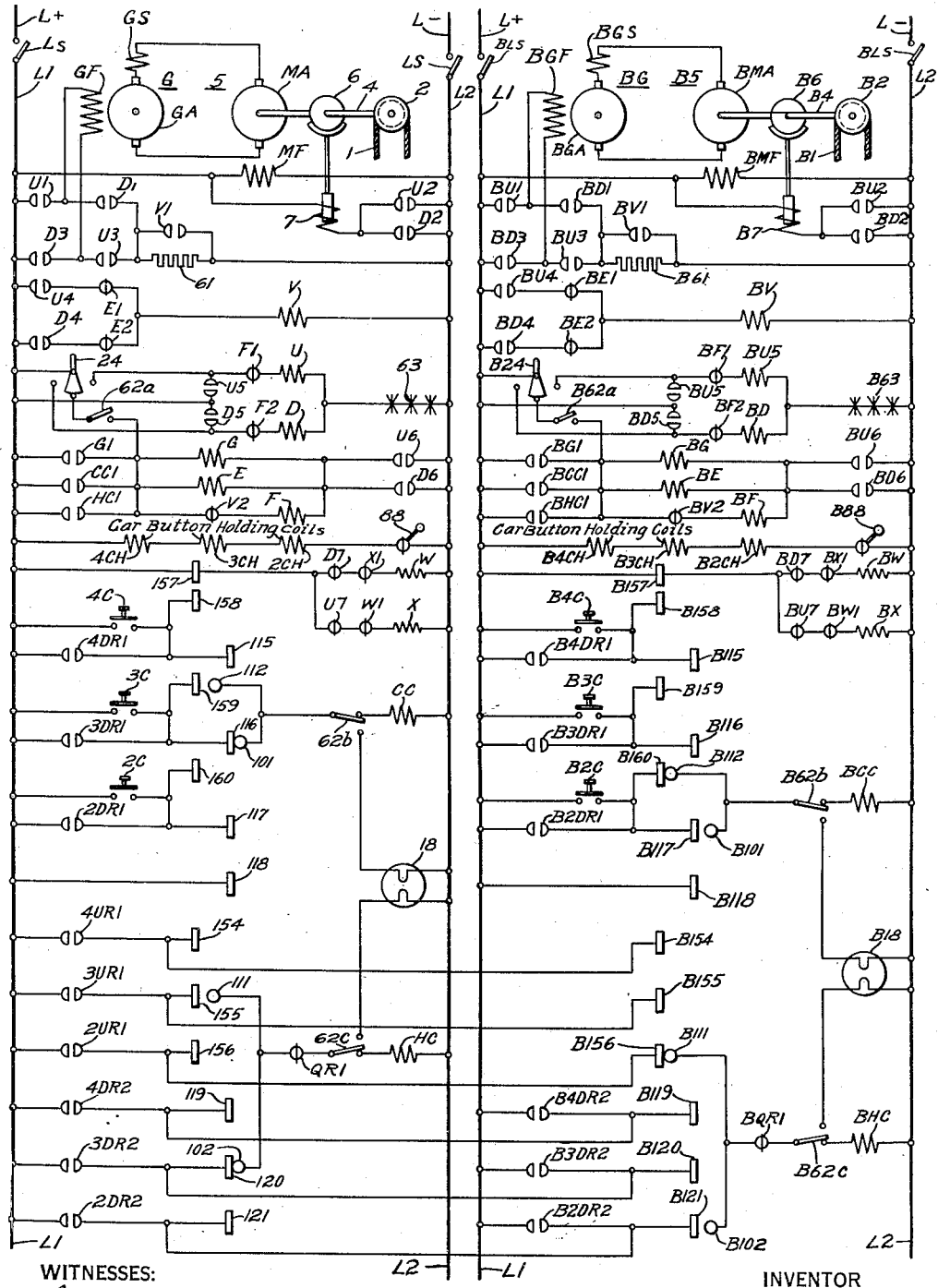
Figure 3A:
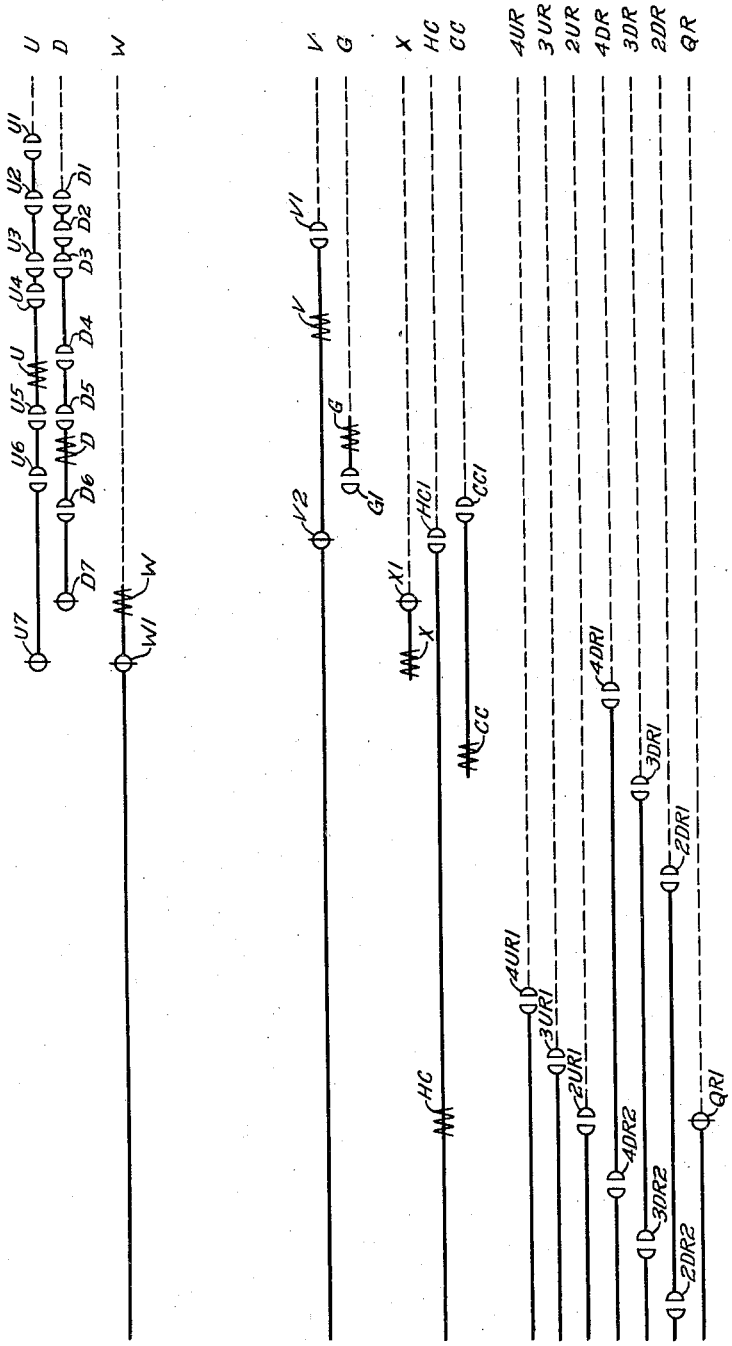

Fig. 3 in conjunction with Fig. 3A illustrates diagrammatically the motor control circuits and switches that may be used for two cars in an embodiment of my invention.

Figure 4:
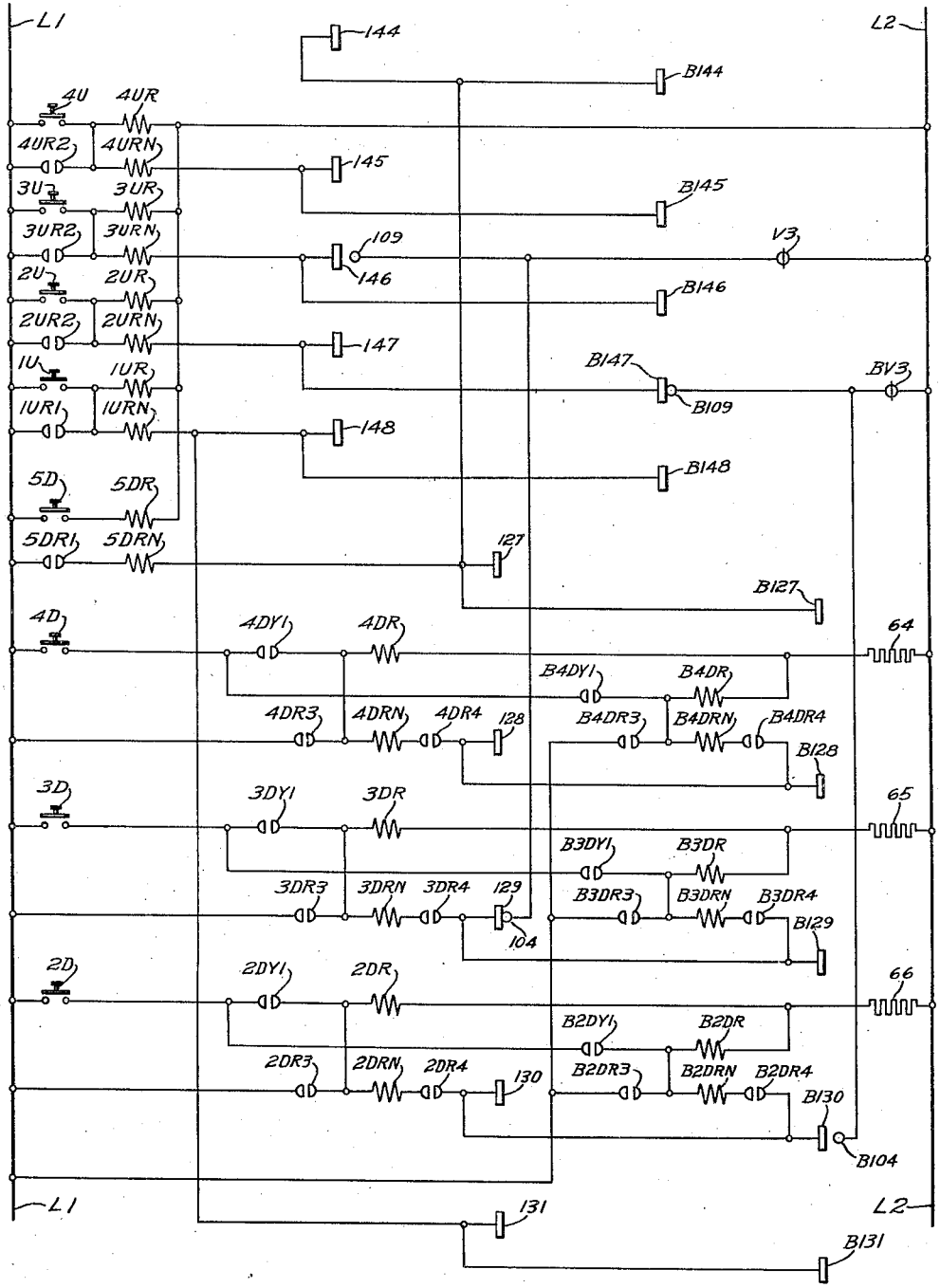
Figure 4:
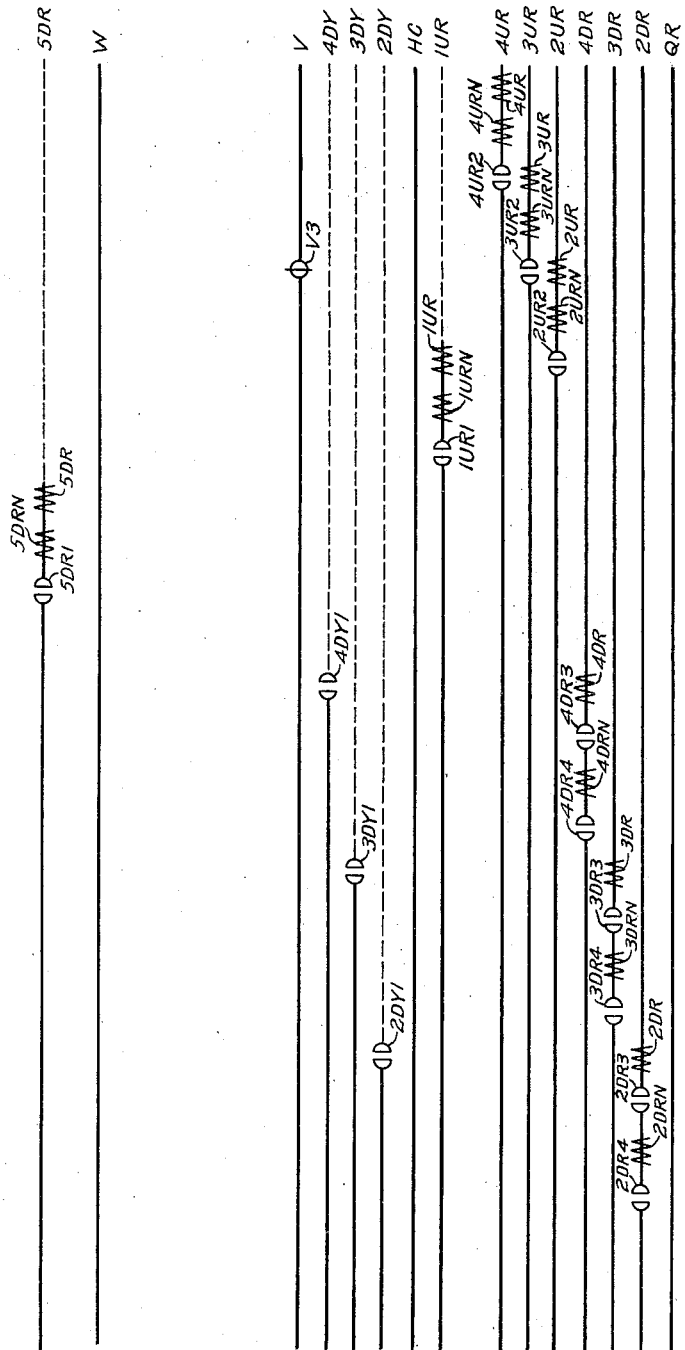

Fig. 4 is conjunction with Fig. 4A shows floor buttons and responsive circuits and relays for registering calls for service from the various floors of the bank of elevators.

Figure 5:
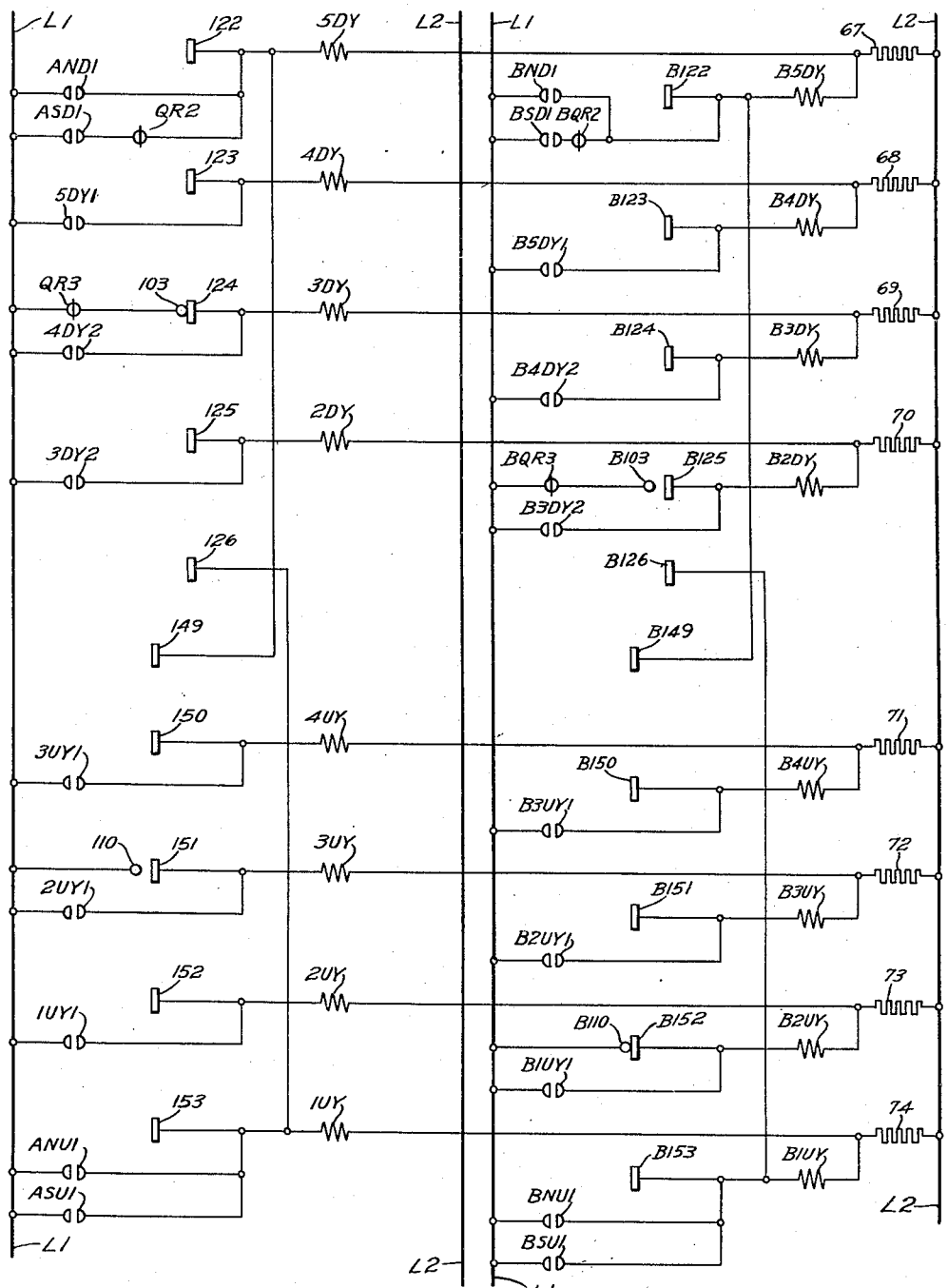

Fig. 5 in conjunction with Fig. 5A illustrates selecting relays and associated circuits that are used in conjunction with the circuits in Fig. 5 to cause the calls to be registered on the proper car.

Figure 6:
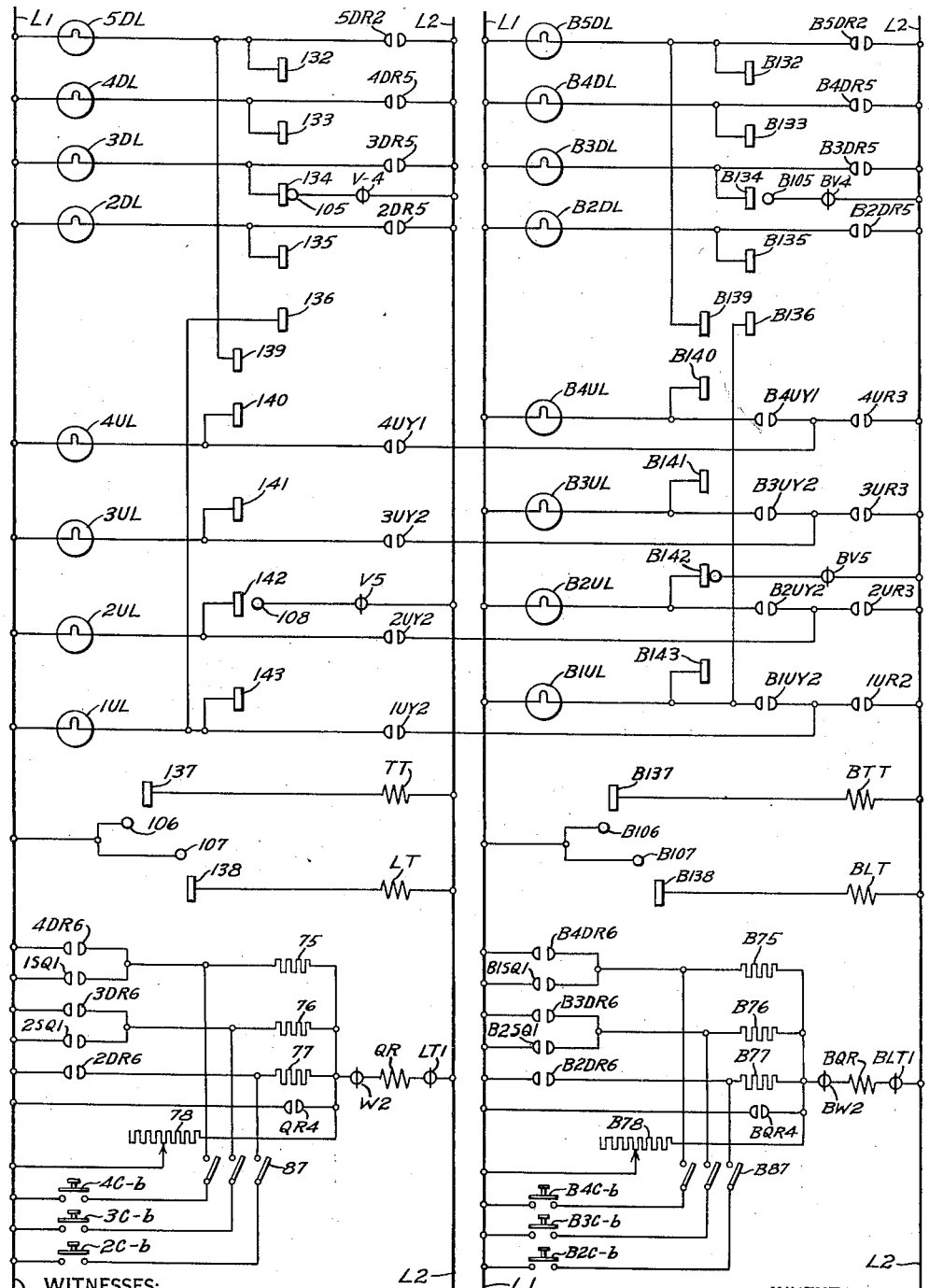
Figure 6:
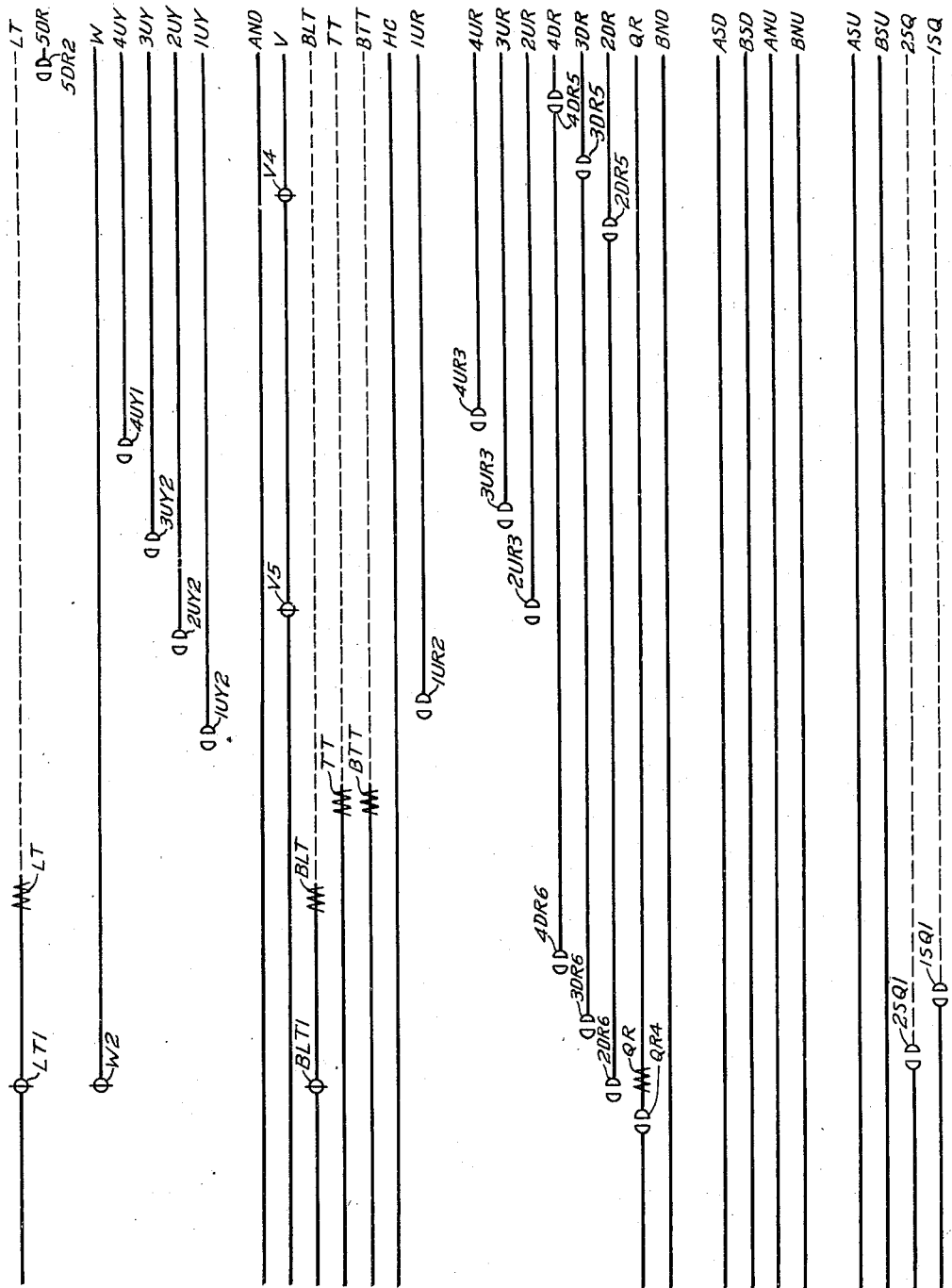

Fig. 6 in conjunction with Fig. 6A shows the circuits and relays used in giving a responsive signal at the floors when the floor buttons are operated and in limiting the number of calls that a given car may accept.

Figs. 7, 8, 7A and 8A show circuits and relays of a dispatching mechanism that may be used in this embodiment of my invention.

Figure 9:
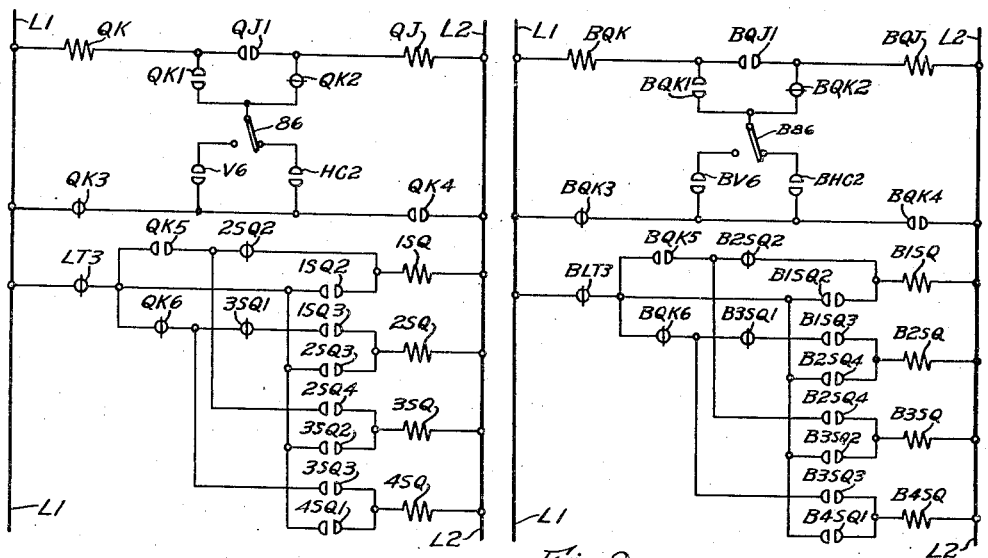

Figs. 9 and 9A show additional circuits and relays useful in accomplishing the objects of my invention.

Figure 10:
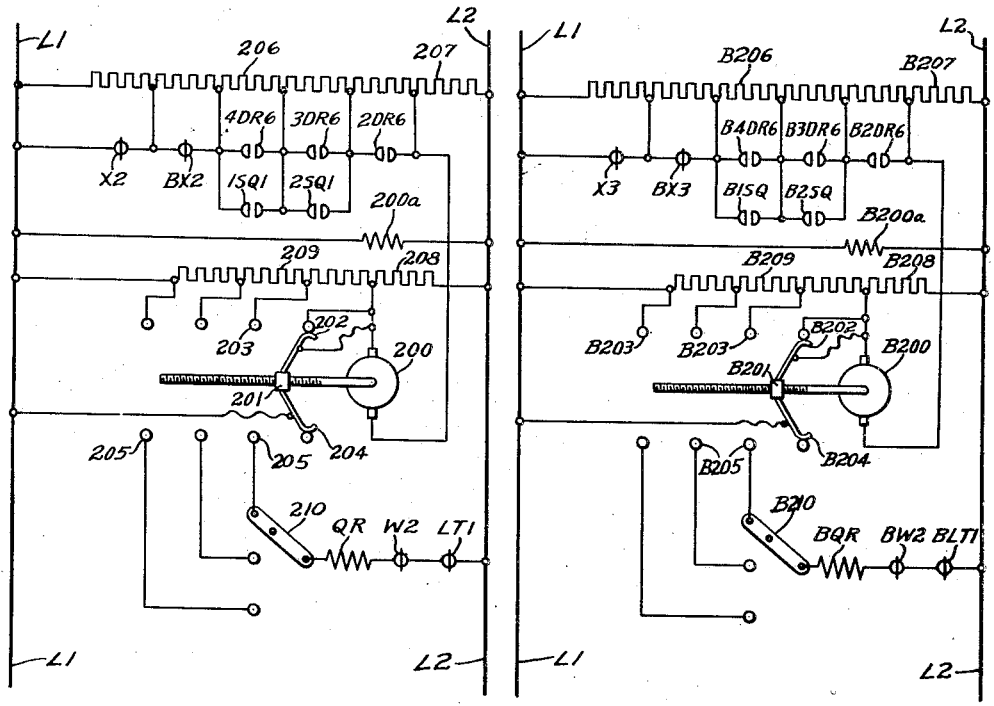

Fig. 10 shows an alternate method of operating the quota relay, and

Fig. 11 shows the relative sizes and location of conducting segments and contacting brushes of the selector mechanism used with each car of my system. Segments are illustrated for five floors, the first and fifth floors being terminal floors.

The Figs. 3A through 9A may be assembled alongside of diagrams Figs. 3 through 9, respectively. By arranging the various figures, each set below the preceding set starting with Figs. 3 and 3A, a complete diagram embodying my invention will appear.

By projecting horizontally, any contact may be identified with its operating coil by the markings associated, the coil with its associated circuits may be located, and other contacts on the same switch or relay operating simultaneously in other circuits may be located.

To reduce the diagram to a minimum only the circuits for two cars A and B are illustrated. (Certain exceptions appear where for clearness circuits for three cars are shown.) It will be understood that the system may be extended to include any number of cars, by obvious duplicating of circuits and cross connections.

Wherever possible apparatus individual to car B is given the same markings as the corresponding apparatus for car A but the marking is preceded by the letter B. Thus relay 3DY for car A is marked B3DY for car B. A third car's relay would be marked C3DY.

GENERAL DESCRIPTION

The several cars of the bank of elevators are each driven by an individual Ward Leonard variable voltage motor drive. The starting of each car is controlled by a master switch on the car which may also control the closing and opening of power operated doors. Acceleration occurs automatically. Stopping is automatic and each car stops for calls registered on its system. Slowdown occurs at predetermined positions in advance of the floor such that the stopping accurately at the floor occurs with the minimum of shaft travel and in the minimum of time.

My invention may be used with elevators in which the slowdown is initiated manually in response to a signal in each elevator cab. Calls for stopping the cars or stop signals may be registered on individual floor push buttons in each car or on push buttons at each floor common to all the cars forming the bank.

The floor calls may be registered on a common call storing relay and control the stopping of all cars equally or they may be registered on relays individual to each car and be effective to control that car to the exclusion of other cars.

When any floor call is registered it is immediately acknowledged automatically by the nearest car available to respond. The acknowledgment is accomplished by lighting a direction signal for that car associated with the car at the floor.

The cars are kept in proper order and on proper schedule by a dispatcher that signals cars at terminal floors when to leave. The dispatcher also gives preparatory signals to advise the car operator that his car will receive the next start signal.

To assist in keeping cars on their schedule and prevent as far as possible their being unreasonably detained I have provided quota relays to limit the number of calls a car can receive and thereby limit the number of stops the car will make in a given trip.

Any car standing at a terminal waiting to receive a start signal will receive the signal immediately if its quota becomes filled, that is, if it has accepted a predetermined number of floor calls.

A car that does not have its quota filled may pass another car that has been retarded by having a large number of calls to answer. In this event the passing car will answer calls registered on the tardy car, thereby helping the slow car to keep its place in the schedule. If the passing car has accepted its quota of calls, it will not answer the other car's calls under the conditions assumed. Under the conditions where the passing car does not have its quota, any additional stops for calls registered on the other car will add to the quota number of the passing car.

The quota circuit may be arranged to count only hall calls, or both hall calls and car calls, or hall calls and additional stops such as its own car calls or hall calls of other cars, or it may count registered hall calls, car calls and additional stops for other cars' hall calls.

Under the condition that a car leaves a terminal in a shorter than normal interval after the preceding car left, due to its having received its quota of calls, the next car to leave will start timing its normal interval from the time of departure of the early leaving car.

If there is no car at the top terminal at the time the last car leaves any down calls between the terminal and the position of the car last to leave the terminal will be registered on the up moving car nearest to the terminal. If this car receives its quota of down calls while still on up motion subsequent down calls in the zone will be registered on the next nearest car to the terminal.

*Control apparatus individual to car A*

| | |
|---|---|
| U | Up reversing switch. |
| D | Down reversing switch. |
| V | High speed relay. |
| E | Slowdown inductor coil. |
| F | Stop inductor coil. |
| G | Holding relay. |
| W | Up direction preference relay. |
| X | Down direction preference relay. |
| 2C, 3C, 4C | Car buttons. |
| 2CH, 3CH, 4CH | Car button holding coils. |
| CC | Car call stopping relay. |
| HC | Hall call stopping relay. |
| 4DR, 3DR, 2DR | Hall call storing relay. |
| 5DY, 4DY, 3DY, 2DY | Down car selecting relays. |
| 4UY, 3UY, 2UY, 1UY | Up car selecting relays. |
| 5DL, 4DL, 3DL, 2DL | Down floor lanterns. |
| 4UL, 3UL, 2UL, 1UL | Up floor lanterns. |
| TT | Top terminal relay. |
| LT | Lower terminal relay. |
| QR | Quota relay. |
| QK, QJ | Chain driving relays. |
| 1SQ, 2SQ, 3SQ, 4SQ | Quota stop counting relays. |
| AND | Dispatcher next down relay. |
| ANU | Dispatcher next up relay. |
| ASD | Dispatcher start down relay. |
| ASU | Dispatcher start up relay. |
| ATE | Dispatcher disconnect relay. |

*Control apparatus common to bank*

| | |
|---|---|
| 4UR, 3UR, 2UR, 1UR, 5DR | Hall call storing relays. |

TDM Down dispatcher signal storing relay.
TUM Up dispatcher signal storing relay.
ITD ⎫
2TD ⎪
3TD ⎬ Down interval relays.
4TD ⎪
ITU ⎫
2TU ⎪
3TU ⎬ Up interval relays.
4TU ⎪
TDH Down impulsing relay.
TUH Up impulsing relay.
TDJ ⎫
TDK ⎬ Down dispatcher chain driving relays.
TUJ ⎫
TUK ⎬ Up dispatcher chain driving relays.

*Description of the apparatus*

Referring now to Fig. 1, car A is shown suspended by cable 1 which passes over driving sheave 2 to counterweight 3. The sheave 2, a driving motor 5, and a brake sheave 6 are mounted on a common shaft 4. An electromagnetic brake magnet 7 releases brake shoes which are spring applied in a well known manner. A floor selector 9 is also driven by shaft 4 through a mechanical connection so that a selector carriage 8 driven by a lead screw 10 moves in accordance with movements of motor 5 and car A.

Selector 9 has a plurality of rows of stationary segments 12 with which brushes 11 carried by brush carriage 8 make successive contact as will be explained more fully in connection with Fig. 11.

Car A is provided with two electromagnetic inductors IE and IF. Inductor E termed a slow down inductor is provided with a coil E and two normally closed contacts E1 and E2. The latter cooperate with plates of magnetic material 14—15 mounted along the elevator shaftway. When coil E is energized both contacts remain in the deenergized position. As car A moves up the shaft contact E1 is brought near plate 14 and magnetic attraction causes armature 19 to move and thereby open contacts E1. When the armature moves to the energized position it remains there until the coil is deenergized. Similarly, contacts F1 of stopping inductor IF open when the latter is brought into cooperative relation with plate 16 as the car moves up the shaft.

In a similar manner contacts E2 and F2 cooperate with plates 15 and 17 when the car is moving down. Each floor served by car A has a set of plates. Slow down and stopping of the car are caused by the opening of these contacts and the car stops at a given floor by the proper selection of the time for energization of the coils of the inductors. This selective energization is accomplished by the brushes and segments of the floor selector 9 as will be described later.

The energization of the inductors may be accomplished manually by releasing the handle of a car starting switch 24 in response to the flashing of a car stopping signal 18. The latter is operated through selector action as will be described later.

In the event that it is not desired to stop the car by the releasing of the car starting switch 24, provision is made for energizing inductor coils E and F automatically in response to the operation of car push buttons 25 and floor push buttons 26. One button for each intermediate floor served is provided in car buttons 25 (three are illustrated). These serve to stop the car in either direction of travel. They are each provided with a coil which when energized will hold the button in the operated position but will not move the button to the actuated position. When the coil is deenergized a spring moves an actuated button to the unoperated position.

An up button 26b and a down button 26a are provided at each floor common to all the cars to stop any car of the bank.

Each car has an up and a down signal light 27—28 associated with its door at each floor.

Each car is provided with a dispatcher disconnecting button 29 for including or excluding the car from a dispatching system. This dispatching system automatically operates signal lamps to advise each car operator the most desirable time to start his car. These signals are indicated in Fig. 1, reference character 31 being a "Next up" signal, 32 a "Next down", 33 a "Start up" and 34 a "Start down" signal.

A second car B is indicated in Fig. 1 with parts as described for car A with the exception of the hall car stopping buttons 26 which are common to all cars. Similar parts will bear similar designating numerals except that to avoid confusion each numeral is preceded by the letter B. Thus the motor for car B is designated B5.

Fig. 2 illustrates a motor driven timing mechanism TM that is useful for determining the intervals at which the cars should leave the dispatching floors. A motor armature 41, preferably of the direct current type provided with a shunt field 42, drives a shaft 44 through a speed reducing gear 43. A plurality of cams 45 are mounted on shaft 44. Each cam as it turns closes a set of contacts 47 and 48 by moving a pivoted lever 46. A spring 49 is arranged to open the contacts when the cam rotates further. The various cams are placed on the shaft so that the contacts close and open in a sequence which repeats for each revolution of the shaft 44.

Referring now to Fig. 11, I have illustrated an arrangement of selector segments and contacts that is useful in one embodiment of my invention. Segments for five floors for both up and down car motion are shown. The relative length and location of the segments is shown with respect to lines representing floor levels on the asumption that when a car is stopped at a floor the moving brushes 11 will be positioned at the line for the corresponding floor. Thus in Fig. 11, the parts are positioned correctly for the car at the third floor level.

Down segments 13 are shown to the left of the lead screw 9 that moves brush carriage 8 up and down. Up segments 12 are shown to the right. Brush carriage 8 is arranged to tilt with the motion of the screw 10 so that on down motion of the car, brushes will engage segments 13 and will not engage segments 12. When the car reverses and moves in the up direction, friction between screw 10 and the threaded portion of carriage 8 will tilt the carriage so that brushes will engage segments 12 and will disengage segments 13.

Fig. 10 shows an alternate method of operating the quota relay in which the quota number is a function of the calls registered on a car and the total number of cars that are on the down motion. Motor 200 drives a nut 201 carrying a brush 202, moving it over stationary contacts 203. A second brush 204 is also driven over stationary contacts 205.

Motor armature 200 is connected in a bridge circuit with four resistors 206—207—208—209. Normally the arms of the bridge are balanced so that no current flows through armature 200. If the resistance of arm 206 becomes less by having one or more sections shorted by the closing of contacts 2DR6 to 4DR6 then current will flow through the armature 200 by the path L1—206—200—208—L2, shunt field 200a is so connected that rotation will occur to move brush 202 to short out one or more sections of resistor 209. This action continues until the bridge is again balanced and no actuating current flows through armature 200.

The simultaneous movement of brush 204 over segments 205 occurs. If it comes in contact with a segment connected to quota setting switch 210, quota relay GR becomes energized.

L1—204—205—210—QR—W2—LT1—L2 (Fig. 10)

It will be readily seen that any desired movement of brush 204 can be required to close the circuit to quota relay QR by moving switch 201. Thus if the position illustrated of brush 204 to the first connected segment is required, this requires the minimum movement of brush 202 and motor 200 which corresponds to the minimum resistance shorted in arm 206.

Two contacts X2 and BX2 are shown shorting sections of resistance of arm 206. With contacts X2 open, the shorting of one of the sections by contacts 2DR6 to 4DR6 will result in a balanced bridge so that an additional section must be shorted to cause the minimum movement of brush 204. Thus car A on a down trip opens contacts X2 and increases the number of calls required to operate relay QR by one. If both cars A and B should be on the down trip simultaneously contacts X2 and BX2 would both be open and three sections would have to be shorted to get the minimum movement. Thus the quota number is increased in proportion to the cars on a down trip.

In Fig. 11, notations have been made associated with each row of segments indicating the function of the segments in the control system. These notations will be better understood in connection with the description of the diagram and the operation of the system that follows.

The apparatus described in the preceding paragraphs, together with the relays of Figs. 3A through 9A and the circuits of Figs. 3 through 9, show one embodiment of my invention. The sequence of operation of the circuits can best be understood in connection with a description of the circuits and the operation.

*Description of the circuits*

When switch LS in Fig. 3 is closed, supply wires L1 and L2 become energized from a D. C. supply circuit L+ and L— (not shown). The armature MA of elevator motor 5 is shown connected in a loop circuit with generator armature GA and generator series field GS in the well-known Ward Leonard connection for driving motors. Generator armature GA is separately driven at a constant speed and supplies voltage to motor armature MA in accordance with the excitation of shunt field GF. The shunt field MF of motor 5 is connected directly across the supply lines and receives continuous excitation.

Generator field GF may be energized in either direction for driving the elevator either up or down. It may be energized at a low value for landing speed or at a high value by closing contacts V1 for high speed. Intermediate steps may be used if so desired. The circuit for energizing the generator field at landing speed for up car motion may be traced through the following elements:

L1—U1—GF—U3—61—L2   (Fig. 3)

The sequence of operation for starting and stopping the car is as follows (assuming switch 62 thrown to the position opposite that of the figure): When start lever 24 is thrown to the left, coil U is energized through a circuit including the elevator door contacts 63, assuming the doors closed and therefore the door contacts closed.

L1—24—F1—U—63—L2   (Fig. 3)

The brake coil 7 becomes energized.

L1—7—U2—L2   (Fig. 3)

Coil V becomes energized causing the car to run at full speed by shorting resistor 61.

L1—U4—E1—V—L2   (Fig. 3)

The car is stopped by centering the lever of car starting switch 24.

Coil U remains energized.

L1—U5—F1—U—63—L2   (Fig. 3)

The coil of relay G and inductor coil E becomes energized.

L1—24—62a—coils G and E in parallel—U6—L2

Inductor plate 14 (Fig. 1) for the next floor opens contact E1 deenergizing the high speed relay V. The car slows down to landing speed since resistor 61 is reinserted. Inductor coil F becomes energized.

L1—24—62a—V2—F—U6—L2   (Fig. 3)

Plate 16 at floor level opens contact F1 interrupting the holding circuit to coil U. These switches drop to the deenergized position applying brake 7 and stopping the car.

For stopping the car automatically in response to calls, the switch 62, which is provided with blades 62a, 62b, 63c is thrown to the position shown in Fig. 3. With this connection inductor coil E is energized by either contact CC1 or contact HC1 closing.

L1—CC1 or HC1—coils E and G—U6—L2

When holding relay G becomes energized, it establishes a self-holding circuit interrupted by contact U6 when the car stops.

Car calls are registered on car push buttons 25 (Fig. 1). If button 3C is operated, it is held in the operated position by coil 3CH and selector segments 116 and 159 are connected to conductor L1. If the car is on down motion, brush 101 will be in position to contact segment 116 as the car approaches the third floor. Relay CC becomes energized to initiate slowdown, as described previously.

L1—3C—116—101—62b—CC—L2   (Fig. 3)

If switch 62 had been thrown to the other direction signal lamp 18 in the car would be energized instead of coil of relay CC. This lamp warns the operator when he should center start lever 24 to stop in response to the call for this floor.

If the car had been on up motion, brush 112 would be moved to a position to engage segment 159 as the car approached the third floor in the up direction. Brush 101 would be disengaged from its associated segments.

The car may be stopped for a third floor down hall call by relay CC being energized through contact 3DR1. It may also be stopped by contact B3DR2 of car B energizing coil HC.

L1, B3DR2, 120, 102, QR1, 62c, HC, L2
             (Fig. 3)

Thus a call registered on a relay of car B may stop car A under the proper conditions.

Fig. 4 shows the circuits for energizing the hall call storing relays. An up call for the third floor may be registered on relay 3UR by pressing the third floor up button 3U.

L1, 3U, 3UR, L2    (Fig. 4)

Relay 3UR establishes a self-holding circuit.

L1, 3UR2, 3UR, L2   (Fig. 4)

The call may be cancelled when car A stops at the third floor by the engagement of selector segment 146 and brush 109 energizing coil 3URN as the ampere turns of 3URN are equal to and of opposite direction and on the same core as those of coil 3UR.

L1, 3UR2, 3URN, 146, 109, V3, L2 (Fig. 4)

It may be cancelled by car B stopping.

L1, 3UR2, 3URN, B146, B109, BV3, L2
             (Fig. 4)

A down call for car A may be stored by pressing the third floor down button 3D when contact 3DY1 is closed.

L1, 3D, 3DY1, 3DR, 65, L2 (Fig. 4)

Relay 3DR establishes a self-holding circuit.

L1, 3DR3, 3DR, 65, L2  (Fig. 4)

Resistor 65 prevents a second relay such as B3DR picking up while relay 3DR is energized. The drop in resistor 65 is so great that only one relay can be picked up through it at time.

The circuit for cancelling 3DR is similar to that for 3UR.

L1, 3DR3, 3DRN, 3DR4, 129, 104, V3, L2
             (Fig. 4)

If contact B3DY1 had been closed instead of 3DY1 the third floor down call would have been registered on car B's relay B3DR.

L1, 3D, B3DY1, B3DR, 65, L2 (Fig. 4)

By the use of similar circuits, it will be evident how floor calls may be registered or cancelled for any floor.

Fig. 5 shows zoning circuits whereby relays individual to each car may be energized. As will be noted by examining the diagram each Y relay corresponds to a floor, there being DY relays for down motion and UY relays corresponding to up motion. Each down Y relay has a contact connected to the coil circuit for the Y relay for the next lower floor. Each up Y relay has a contact connected to the coil circuit of the Y relay for the next higher floor. Thus, if car A has its 5DY relay energized when the car is standing at the fifth floor.

L1, QR3, 103, 122, 5DY, 67, L2 (Fig. 5)

contact 5DY1 will energize relay coil 4DY,

L1, 5DY1, 4DY, 68, L2  (Fig. 5)

and contact 4DY2 will energize 3DY coil.

L1, 4DY2, 3DY, 69, L2  (Fig. 5)

Thus a car picks up Y relays for floors ahead of its motion. The zone will extend to the position of the next car moving in the same direction. Thus, if a second car B were positioned at the second floor on the down motion, it would have B2DY coil energized.

L1, BQR3, B103, B125, B2DY, 70, L2
             (Fig. 5)

The voltage drop produced in resistor 70 is sufficient that while relay 2DY coil is energized through circuit L1, 3DY2, 2DY, 70, L2  (Fig. 5)

it cannot pick up while relay coil B2DY is also being energized, and under the conditions assumed, car A's zone would be from floor 5 to floor 2 and it would have energized coils 5DY, 4DY, and 3DY sufficiently to cause them to pick up and would have partially energized relay 2DY but not sufficiently to cause it to pick up.

As the DY relays determine which car's hall call storing relay (DR and BDR relays (Fig. 4) will be connected to a given floor button, it will be evident that each car will accept floor calls for the down direction at floors in a zone in advance of its position extending to the position of the next car having the same direction of motion.

Fig. 6 shows circuits to the floor lanterns 27 and 28 (Fig. 1) of cars A and B. Each car will light a lantern immediately upon the registration of a floor call at floors in its zone. Thus for up motion, the lanterns are controlled by UY relays, and for down motion by DR relays. Car A can light the third floor up lantern immediately when relay 3UR is energized by the circuit.

L1, 3UL, 3UY2, 3UR3, L2 (Fig. 6)

When the call is cancelled as the car slows down to stop, the lantern will be held by circuit L1, 3UL, 141, 108, V5, L2 (Fig. 6)

Car A can light the third floor down lantern immediately when relay 3DR is energized by the circuit.

L1, 3DL, 3DR5, L2   (Fig. 6)

and maintain it energized when the call is cancelled.

L1, 3DL, 134, 105, V4, L2 (Fig. 6)

Relay TT becomes energized when car A is at the top terminal floor.

L1, 106, 137, TT, L2

Similarly, relay LT becomes energized at the lower terminal floor.

L1, 107, 138, LT, L2   (Fig. 6)

Relay QR called a quota relay (Fig. 6) has an adjustable pick up. That is, it may be set to operate at a predetermined current in its coil. Current is supplied by four resistors 75—76—77—78 in parallel. If we assume resistance 78 to be very high and that with resistors 75—76 and 77 connected to conductor L1 sufficient current passes to operate relay QR, then relay QR operates to limit the call answering capacity of car A when three down calls are registered. If manually adjustable resistor 78 is set to supply a current equal to one of resistors 75—76 or 77 then only two additional circuits are required to cause relay QR to operate and it is said to be set for a quota of two calls. Each of the resistors 75, 76 or 77 may be connected to conductor L1 by any one of three means. A hall call being registered for the fourth floor down will close contact 4DR6. A car call for the fourth floor will close contact 4C—b, this contact being on the same stem as car push button contact 4C of Fig. 3. Likewise, contacts 3C—b and 2C—b are respectively on the same stems with contacts 3C and 2C of Fig. 3. Contact ISQI being closed will connect resistor 75 to LI.

It is therefore evident that a hall call or car call will cause current to flow through resistor 75 to partially energize relay coil QR. Contacts ISQI and 2SQI close when the car stops for hall calls, as will be explained in connection with Fig. 9. Relay QR when it operates remains energized through a self-holding circuit and causes car A to receive an immediate dispatch signal when it is at the top dispatching terminal by operating relay TDM.

$$L1—QR5—TT1—TDM—$$
$$ASD2—BSD2—CSD—L2 \quad (Fig. 7)$$

It also causes car A to lose its zone by opening the feed wire to the DY relays (Fig. 5). Thus the circuit $$L1—QR3—103—124—3DY—69—L2$$
$$(Fig. 5)$$

is opened by contact QR3 deenergizing coil 3DY. In Fig. 3 QR1 opens a circuit $$L1—B3DR2—120—102—QR1—$$
$$62c—HC—L2 \quad (Fig. 3)$$

preventing the energization of relay HC for the call registered on car B for the third floor down. Relay QR becomes deenergized at the lower terminal floor when contact LT1 opens.

Figure 7:
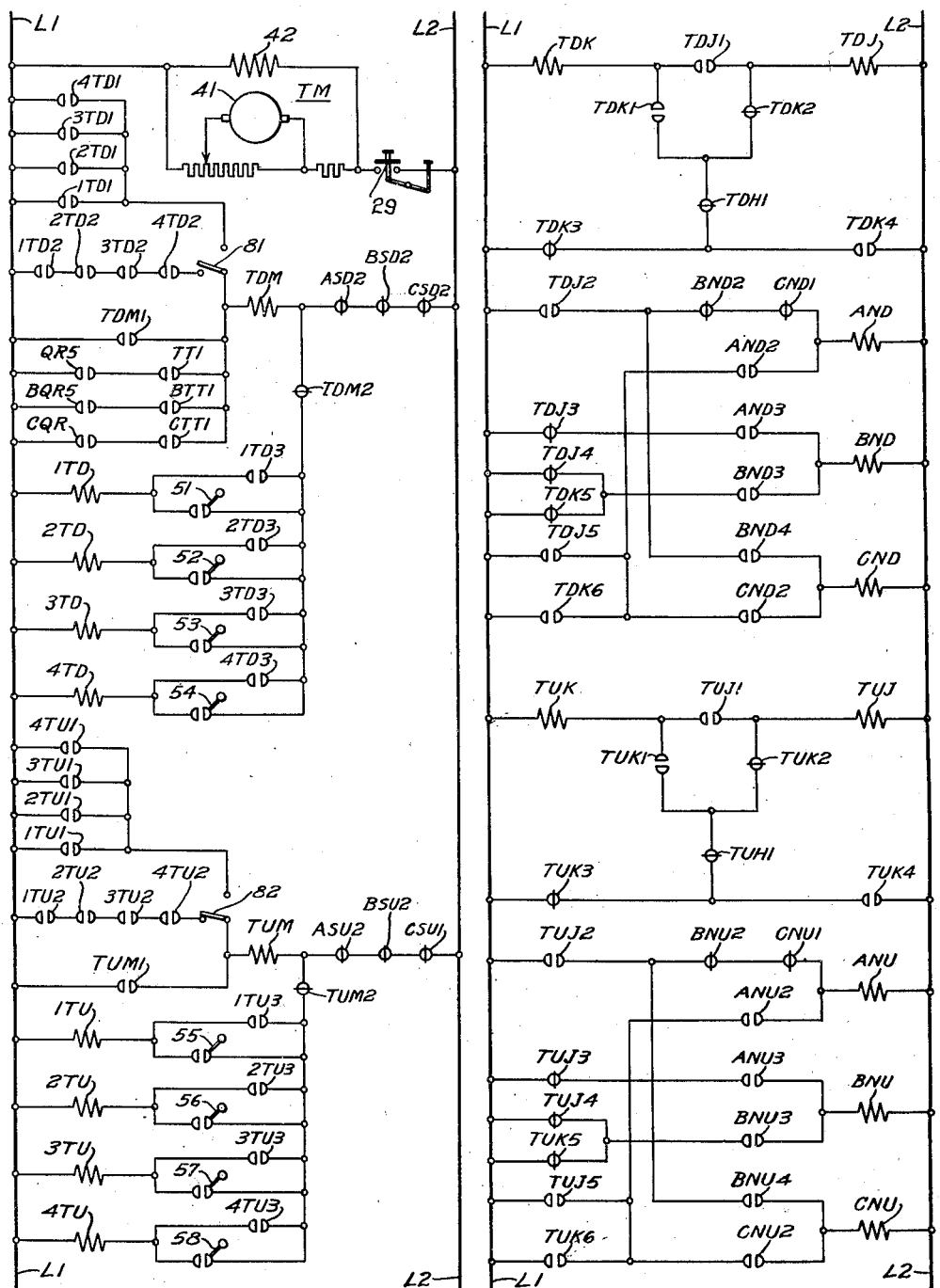
Figure 7:
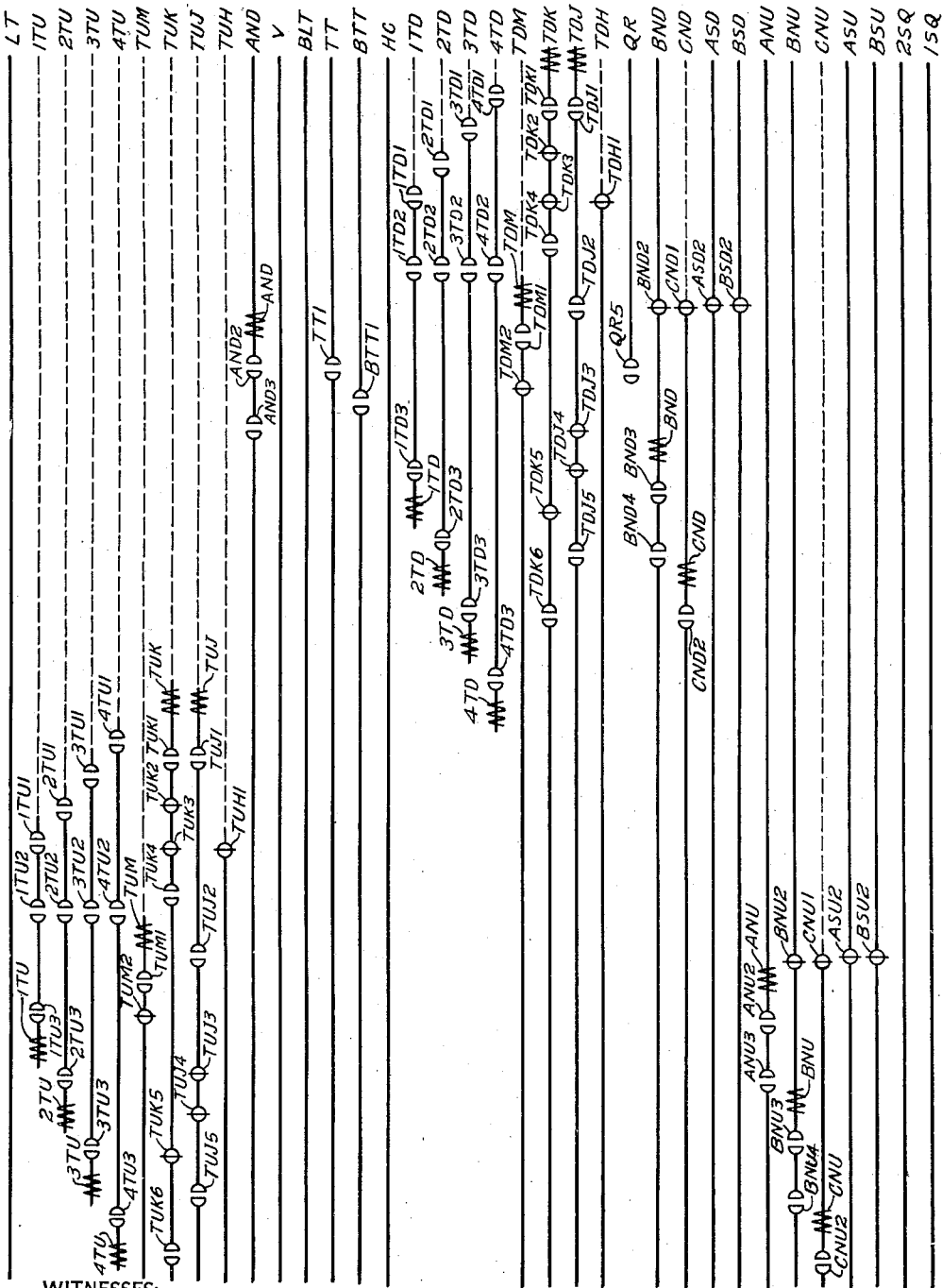
Figure 8:
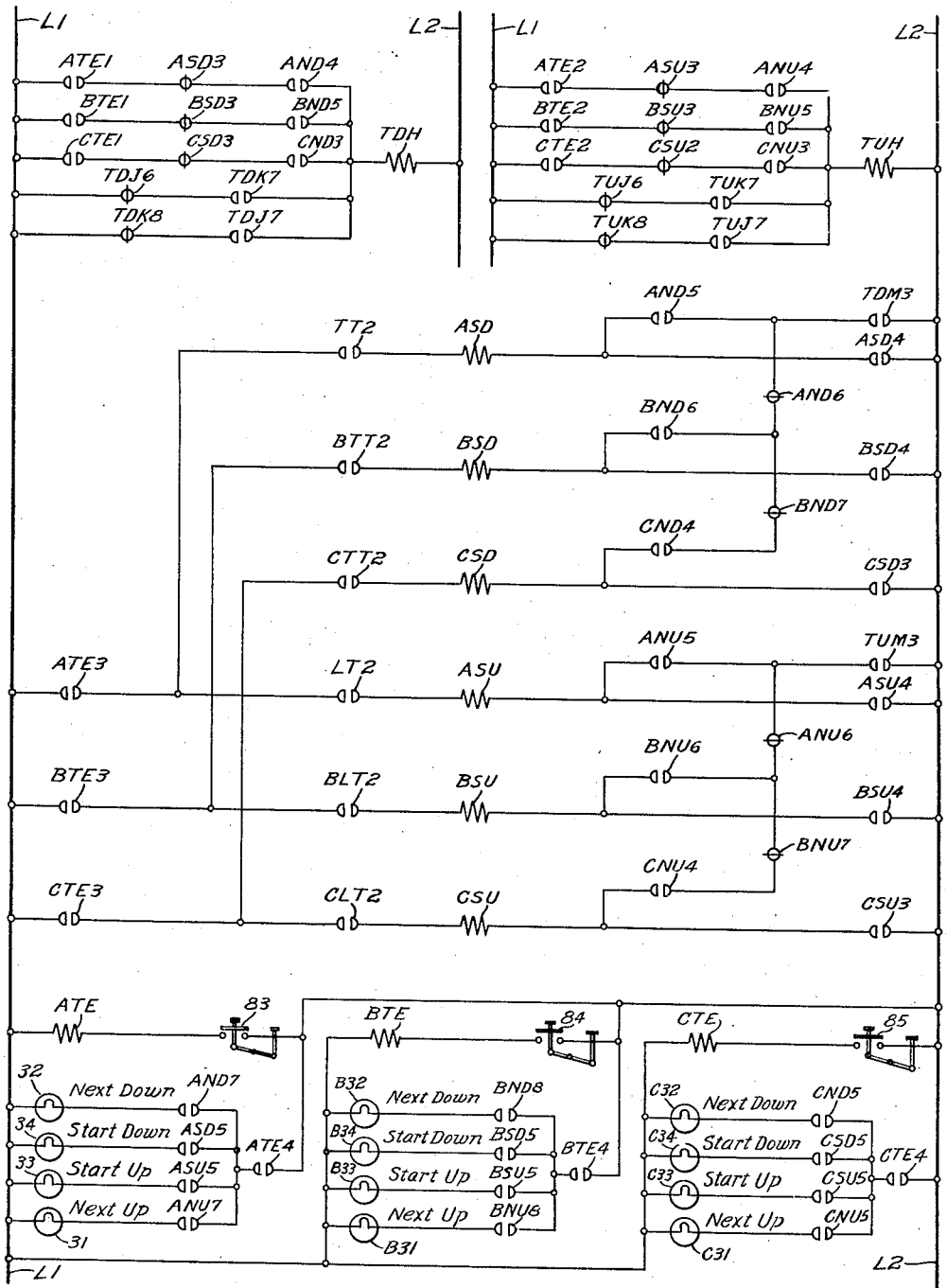
Figure 8:
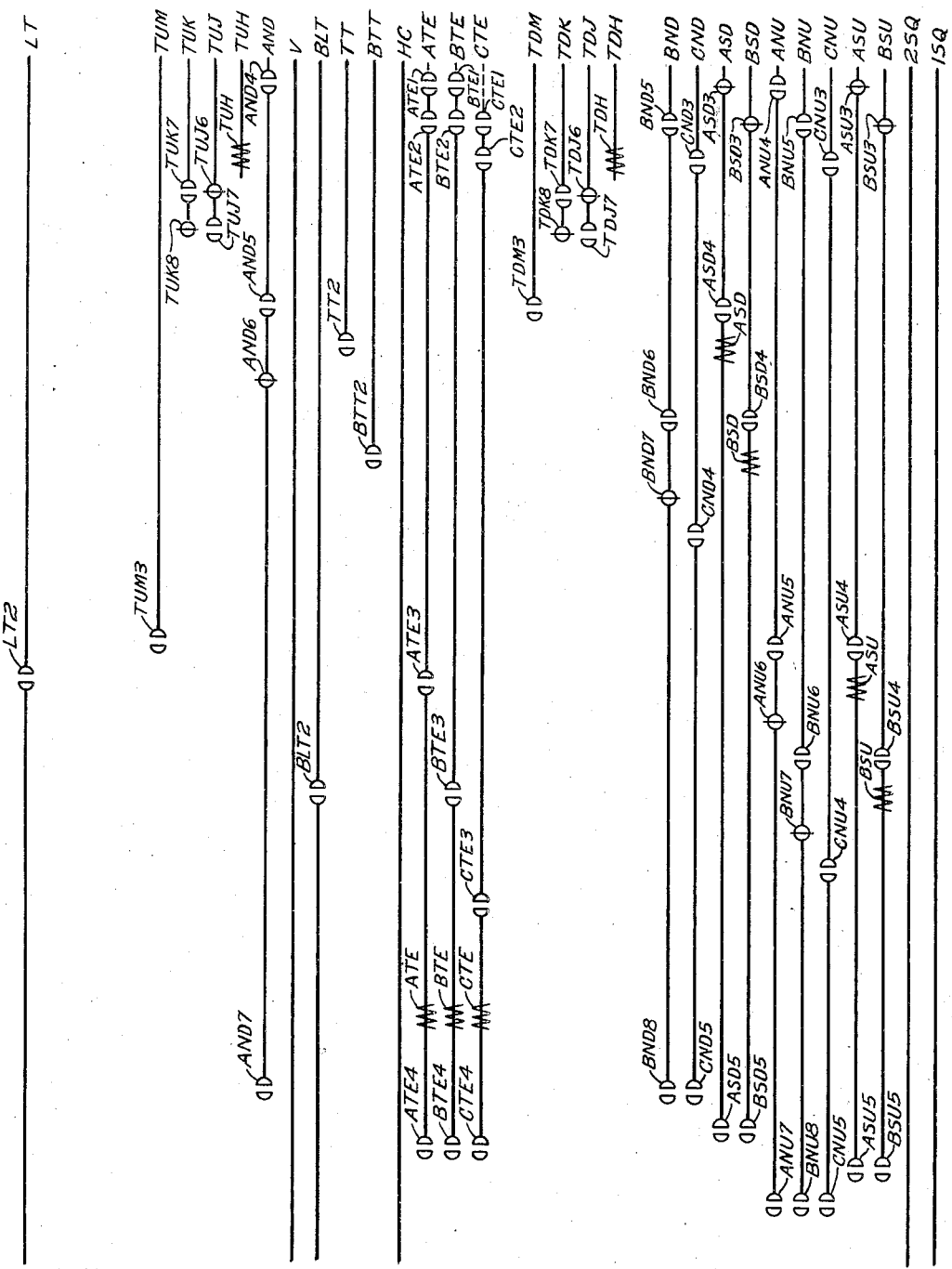

Figs. 7 and 8 are the dispatching circuits for three cars A—B and C. The dispatcher keeps the cars in proper rotation and spaces them with respect to time in leaving two dispatching floors, in this case chosen as the two terminal floors.

A timing motor TM with armature 41 and field 42 may be connected to the supply by a switch 79. Contacts 51, 52, 53 and 54 energize relay coils 1TD, 2TD, 3TD, 4TD in sequence. Thus contact 51 energizes coil 1TD $$L1—1TD—51—TDM2—ASD2—$$
$$BSD2—CSD2—L2 \quad (Fig. 7)$$

When once energized, the coils remain energized through self holding contacts until they are deenergized by contacts TDM2—ASD2, etc.

When all four relays 1TD to 4TD have been energized a circuit is established to energize relay TDM $$L1—1TD2—2TD2—3TD2—4TD2—81—$$
$$TDM—ASD2—BSD2—CSD2—L2 \quad (Fig. 7)$$

Relay TDM as mentioned previously gives a dispatch signal to one of the cars.

Under some conditions it is desirable to dispatch cars at a faster rate. If switch 81 is moved to its other position, relay TDM will be energized when any one of relays 1TD to 4TD are energized and dispatching signals will be given in this case four times as fast as normal.

Relay TDM gives down signals and similar circuits are provided to give up signals through relay TUM.

To keep the cars in a desired sequence, a set of "next down" relays AND, BND, and CND, (Fig. 7) and a set of "start down" relays ASD, BSD and CSD (Fig. 8) are provided. Contacts of these relays control signals on each car (31—32—33—34) to give appropriate signals to the operators of the cars for the proper starting of the cars from the dispatching floors.

Relays AND, BND and CND pick up in sequence and are picked up and dropped out by driving relays TDJ and TDK, which in turn are caused to operate by relay TDH. Relay TDH in turn is caused to operate by relays ASD, BSD and CSD which in turn are operated by relay TDM. Relay TDM is controlled by the TD relays which are operated by the timer motor as mentioned previously. Relay TDM may also be operated by the relay QR, BQR and CQR the quota relays for the cars. A similar set of up relays ANU, BNU, CNU, ASU, BSU, CSU, TUH and TUM are similarly operated for up dispatch signals. The sequence of the operation of these relays will appear later.

A set of relays ATE, BTE and CTE are provided so that any given car can be removed from the sequence or if not in the sequence can be included in it. These relays are controlled by manually operated switches 83, 84 and 85.

Fig. 9 shows circuits for counting stops. Each time car A makes a stop for a hall call one relay of the group 1SQ, 2SQ, etc. becomes energized. These relays are energized through circuits controlled by relays QJ and QK and their contacts control circuits to car A's quota relay QR. Relays QJ and QK are operated by either of two circuits that may be selected by a manually operated switch 86. The first contains contact V6 which is closed while the car runs and open when it stops. Thus each time the car starts and stops contact V6 closes and opens. As will be described later one of the stop counting relays 1SQ, etc. is closed for each operation.

The other circuit contains a contact of relay HC so that each time a hall call is answered, relay HC is energized and one of the SQ relays is thereby energized.

*Description of the operation*

The operation of the cars in this system is very similar to that in my copending application Serial No. 57,558. Therefore, a detailed description will be given of only those portions of the operating sequence necessary for an understanding of the novel features of my invention.

In the normal operation of the bank of cars, it is desired to keep the cars from getting together because an uneven distribution of the cars causes long intervals between the times that successive cars pass a given floor with correspondingly long waits by prospective passengers at the floors. One of the factors that causes a car to get behind its normal position is that floor calls are not registered uniformly. I have provided a quota relay QR (for car A) whose operation limits the number of floor calls that can register to stop it on a given down trip. Calls registered later than this quota that would normally stop it are reserved for response by car B or whichever car follows A. Thus, a sudden rush of calls that would disrupt the sequence of an ordinary group of cars will be assigned to several cars and no one car is unduly retarded in its down trip.

If we assume three cars A, B and C in the bank with car A at the top floor and car B on an up trip at the third floor and car C at the bottom floor. As car A should be the next to leave the top floor, assume relays TT, TDK, TDJ, TDH and AND energized.

$$L1—106—137—TT—L2 \quad (Fig. 6)$$
$$L1—TDK—TDJ1—TDJ—L2 \quad (Fig. 7)$$
$$L1—ATE1—ASD3—AND4—TDH—L2 \quad (Fig. 8)$$
$$L1—TDJ5—AND2—AND—L2 \quad (Fig. 7)$$

When the four TD relays become energized by the timer motor operated contacts 51 to 54 as described previously, relay TDM picks up.

L1—1TD2—2TD2—3TD2—4TD2—81—
    TDM—ASD2—BSD2—CSD2—L2  (Fig. 7)

which locks in through circuit

L1—TDM1—TDM—ASD2—
    BSD2—CSD2—L2  (Fig.7)

which energizes relay ASD

L1—ATE3—TT2—ASD—
    AND5—TDM3—L2  (Fig. 8)

Relay ASD gives car A a "start down" signal

L1—34—ASD5—ATE4—L2  (Fig. 8)

Assume that before the car received this "start down" signal, a call was registered for down travel at the fourth floor by operation of floor button 4D. Relays 5DY to 2DY are energized.

L1—AND1—5DY—67—L2  (Fig. 5)
L1—5DY1—4DY—68—L2  (Fig. 5)
L1—4DY2—3DY—69—L2  (Fig. 5)
L1—3DY2—2DY—70—L2  (Fig. 5)

Relay 4DR becomes energized

L1—4D—4DY1—4DR—64—L2  (Fig. 4)

and remains energized

L1—4DR3—4DR—64—L2  (Fig. 4)

Quota relay QR becomes energized (assuming for illustration a quota setting of one call)

L1—4DR6—75—W2—QR—LT1—L2  (Fig. 6)

and remains energized

L1—QR4—W2—QR—LT1—L2  (Fig. 6)

Relay TDM becomes energized

L1—QR5—TT1—TDM—ASD2—
    BSD2—CSD2—L2  (Fig. 7)

This gives car A a "start down" signal (as described previously before the timer motor picks up the four TD relays. Relay ASD becoming energized by either sequence deenergizes relay TDH by opening its energizing circuit. Contact TDH1 short circuits coil TDJ.

TDJ1—TDK1—TDH1—TDK4  (Fig. 7)

Relay TDJ opens but TDK holds through circuit

L1—TDK—TDK1—TDH1—TDK4—L2  (Fig. 7)

Relay BND becomes energized

L1—TDJ3—AND3—BND—L2  (Fig. 7)

Relay TDH becomes reenergized

L1—BTE1—BSD3—BND5—TDH—L2  (Fig. 8)

which breaks the holding circuit to relay TDK and breaks the holding circuit to relay AND L1—TDK3—AND2—AND—L2  (Fig. 7)

Thus car A still at the top floor has had its quota of floor calls it can accept filled and as a result has received an immediate dispatch "start down" signal. As contacts AND1—QR2 and QR3 are now open. Car A loses its feed to the DY relays (Fig. 5) and as relay BND is now energized, car B has received a "next down" signal.

L1—B32—BND8—BTE4—L2  (Fig. 8)

and has picked up its DY relays

L1—BND1—B5DY—67—L2  (Fig. 5)

Relays B4DY—B3DY and B2DY will also pick up through circuits similar to those for car A's DY relays.

If another floor button such as the third floor down is operated, it will register a call on car B.

L1—3D—B3DY1—B3DR—65—L2  (Fig. 4)

even though car B has not yet completed its up trip.

As has been pointed out, a car having its quota relay picked up will receive an immediate dispatch signal even though a normal dispatch interval has not elapsed since the previous car left the terminal. If we assume that half the normal interval had elapsed at the time car A's quota was filled, then two of the TD relays would have been energized, assuming they are 2TD and 3TD. When relay ASD became energized, the TD relays would be dropped out by contact ASD2 and when car A leaves the terminal relay ASD becomes deenergized by contact TT2 opening and the next timer contact, assume it is contacts 54, will pick up relay 4TD to start timing another interval. This interval will be complete when the four TD relays are picked up. Thus any car receiving a start signal will reset the timing relays and when the car leaves another interval starts timing for the next car.

The circuits for stopping a car are arranged so that it will be stopped for any call registered on one of its DR relays. Thus car A will stop for its energized 4DR relay through the circuit.

L1—4DR1—115—101—62—CC—L2  (Fig. 3)

When relay CC picks up contact CC1 will energize the slow down inductor for car A.

L1—CC1—E—D6—L2  (Fig. 3)

In the event that car A has several calls registered on its system and car B following has none, even though car B leaves the terminal, an interval behind car A, there is considerable chance that it will overtake and pass car A. Under these conditions car B will stop for calls registered on car A's system, through its BHC relay. Assume an unanswered floor call on car A for the second floor down and that car B has passed car A. Relay BHC will become energized.

L1—2DR2—B121—B102—BQR1—
    B62c—BHC—L2  (Fig. 3)

and car B will stop for car A's call. While car B is responding to this call, time elapses during which car A may pass car B and assume its proper place in the sequence.

On the other hand, if car B had a quota of calls assigned to it but at lower floors while car A's quota comprised upper floor calls, then car B will not stop for car A calls as described, because the circuit will be opened since contact BQR1 of car B's quota relay is open. Each car will, therefore, respond to only its own calls and as the quota should be set, the same for all cars at a given time, the number of calls for each car will be equal. If equal time is required for response by the two cars to their assigned calls, they will arrive at the lower terminal in their correct order and at a proper interval regardless of the fact that car B passed car A to respond to its own calls.

Quota relay QR (Fig. 6) is energized by a predetermined current as explained previously. Thus, when the fourth floor down call was registered on car A, contacts 4DR6 closed and partially energized relay QR.

L1—4DR6—75—W2—QR—LT1—L2 (Fig. 6)

When car A slows down to answer this call, relay 4DR drops out because of the energization of coil 4DRN by the call cancelling selector brush 104 (Fig. 4)

L2—V3—104—128—4DR4—
4DRN—4DR3—L1 (Fig. 4)

This opens the circuit through resistor 75 but 1SQ1 contact (Fig. 6) closes and keeps the circuit energized as follows. Assuming the quota relay QR not energized, then relay HC will pick up for each hall call L1—4DR2—119—102—QR1—
62c—HC—L2 (Fig. 3)

Relay QJ becomes energized.

L1—QK3—HC2—86—QK2—QJ—L2 (Fig. 9)

When relay 4DR drops out, as noted previously, HC becomes deenergized and QK picks up.

L1—QK—QJ1—QJ—L2 (Fig. 9)

and relay 1SQ becomes energized.

L1—LT3—QK5—2SQ2—1SQ—L2 (Fig. 9)

Relay 1SQ locks in through circuit

L1—LT3—1SQ2—1SQ—L2 (Fig. 9)

If a second call is answered, contacts Hc2 close and open again and relay 2SQ closes. When it closes relay QJ drops out (coil shorted by circuit QJ1—QK1—86—HC2—QK4).

When HC2 opens relay QK drops out as circuit

L1—QK—QK1—86—HC2—QK4—L2 (Fig. 9)

is opened.

Relay 2SQ picks up.

L1—LT3—QK6—3SQ1—
1SQ3—2SQ—L2 (Fig. 9)

Thus two answered calls are still effective to maintain relay QR energized through two resistors in parallel.

Under certain operations, I find it desirable to count stops for car calls as quota calls and I have provided switch 86 and contact V6 to operate the SQ relays when so desired. Thus relay V operates for each stop. If the stop is for a hall call the action is as described for contact HC2. If the stop is for a car call contact V6 connects an extra resistor to QR coil causing it to pick up sooner than it otherwise would.

If switches 87 are closed, car calls may be included in the quota count at the time they are registered instead of at the time the stop is made. When switches 87 are closed, switch 86 must be set to count stops only for hall calls as car calls are not cancelled until the end of the shaft travel by limit switch 88 (Fig. 3).

Under these last conditions, if car A stops for a call registered on car B through the circuit L1—B3DR2—120—102—QR1—
62c—HC—L2 (Fig. 3)

an extra count will be added into its quota by the SQ relay that picks up since no call on car A is cancelled.

The system described will be found to comprise a simple and efficient method of accomplishing the objects set forth and while the system set forth is only one embodiment of my invention, it will be understood, that modifications thereof and changes therein may be made without departing from the spirit and scope of the invention.

I claim as my invention:

1. In a control system for operating a plurality of elevator cars past a plurality of floors; a signal device for each car, means for operating any one of said signal devices to indicate when said signalled car should leave a predetermined floor to maintain said cars in a desired spaced relation; a push button at each of said floors for registering calls for service; call registering means individual to each car responsive to operation of any one of said push buttons for registering a call for service for the associated floor, said call being registered on only one of the call registering means for said cars; and means responsive to the registration of a predetermined number of calls for service for one of said cars for causing an operation of the signal device for that car sooner than said first means would normally operate said signal.

2. In an impulsing mechanism for a dispatcher for a group of elevator cars operable past a plurality of floors in which calls from floors are assignable to individual cars for response, the combination of means to cause an operation of said dispatcher a predetermined time after a first car leaves a predetermined floor to thereby dispatch another car to leave, means responsive to a predetermined number of calls from floors assigned to said other car for operating said dispatcher earlier, and means for causing the next operation to occur said predetermined time after said other car leaves said predetermined floor.

3. In a quota mechanism for an elevator car operable past a plurality of floors; means for registering calls for service for said car at each of said floors comprising a call registering relay associated with each of said floors; means for preventing more than a predetermined number of calls being registered for said car, said means comprising a quota relay and a plurality of parallel-connected energizing circuits for said quota relay, each of said energizing circuits including a resistor and a contact of one of the call registering relays.

4. In a quota control circuit for an elevator car serving a plurality of floors; control devices at each of said floors; control devices in said car one for each of said floors; means responsive to an operation of any one of said control devices for effecting an operation associated with the stopping of said car at the corresponding floor; and quota means responsive to a predetermined number of operated control devices for rendering said first mentioned means unresponsive to floor control devices operated after said predetermined number of said control devices have been operated.

5. In a quota control circuit for an elevator car serving a plurality of floors, the combination of floor stop call means at each floor for registering stop calls for said car; car stop call means on the car for registering stop calls for said car at said floors; stopping means responsive to any of said stop call registering means for stopping said car at the associated floors; and means responsive to a predetermined number of calls registered on either the floor stop call means or the car stop call means for rendering said stopping means ineffective to stop said car for floor stop calls registered after said predetermined number of calls have been registered.

6. In a control system for an elevator car operable past a plurality of floors, means for each floor for registering a call for service on said car, means for stopping said car, means responsive to the number of registered calls at any given time plus the number of stops said car has made up to that time for rendering said first-named means ineffective to register additional calls.

7. In a control system for a plurality of elevator cars serving a plurality of floors, stopping means for each car, means at each floor common to all the cars operable to effect an operation of the stopping means of any car to cause said car to stop at the associated floor, registering means individual to each car responsive to said common means for registering calls on said cars, and selective means responsive to the position of said cars with respect to said floors for causing any individual call to be registered on only one of the cars at any given time, a plurality of car call stopping means on each car one for each floor operable to effect an operation of the stopping means of only the associated car to cause said car to stop at the associated floor, and quota means individual to each car, said quota means for any one car being responsive to the total of the number of calls assigned to said car plus the number of operated car call stopping means of said car plus the number of stops that have been made by said car in response to said common stopping means for rendering said stopping means for said car unresponsive to some of said common means, and for rendering said cars associated registering means unresponsive to the operation of other of said common means.

8. In a control system for an elevator car operable past a plurality of floors, means for each floor for registering a call for service on said car, means for stopping said car at floors for which calls for service are registered on said car; and means responsive to an operation associated with stopping to cancel the registered call for the floor at which said car is stopping, and means responsive to the number of the registered calls plus the number of cancelled registered calls plus the number of stops at floors for which no call had been registered for rendering said first means ineffective to register additional calls when said sum equals a predetermined number.

9. In a control system for an elevator car operable past a plurality of floors, means for each floor for registering a call for service on said car, a plurality of means on said car one for each floor for registering stops for car-carried passengers, means for stopping said car at any floor, and means responsive to the number of registered calls at floors at any given time plus the number of registered stops in the car for floors other than those for which stops are registered at floors for rendering said first-named means ineffective to register additional calls.

10. In a control system for an elevator operable past a plurality of floors; means for each floor for registering a call for service on said car, means for stopping said car in response to said registered calls; means responsive to said car stopping at one of said floors for cancelling a registered call for said floor; quota means responsive to a predetermined number of registered calls for rendering said first-named means ineffective to register additional calls for said car; and additional means responsive to a stop at said floor for affecting said quota means in a manner similar to a registered call.

11. In a quota mechanism for an elevator car operable past a plurality of floors; means for registering calls for service for said car at said floors; a selecting switch responsive to the number of registered calls for movement to a plurality of positions; quota means responsive to the movement of said selecting switch to a predetermined position for rendering said call registering means ineffective to register additional calls; and means to select which predetermined position will be effective.

12. In a quota mechanism for an elevator car operable past a plurality of floors; means for registering calls for service for said car at said floors; a selecting switch responsive to the number of registered calls for movement to a plurality of positions; quota means responsive to the movement of said selecting switch to a predetermined position for limiting the number of calls registered on said car; and means responsive to the car moving in a certain direction to modify the response of the quota means.

13. In a control system for operating a plurality of elevator cars past a plurality of floors in which stopping mechanism for each car is responsive to the operation of a push button at each floor common to the cars for causing the stopping of one of the cars, the combination of means comprising a relay for each car for each floor for registering the calls for service from said floor push buttons to cause a stopping only of a preselected car in response to any given call, a signal for each car for advising when the associated car should leave a dispatching floor, and means responsive to the registration of more than a predetermined number of calls for service for one of said cars for causing the operation of said car's signal sooner than it otherwise would normally be operated.

HAROLD W. WILLIAMS.